(12) United States Patent
Christensen

(10) Patent No.: US 6,883,461 B2
(45) Date of Patent: Apr. 26, 2005

(54) CONSTRUCTION FOR MILKING OF ANIMALS

(75) Inventor: John M. Christensen, Börkop (DK)

(73) Assignee: DeLaval Holding AB, Tumba (SE)

( * ) Notice: Subject to any disclaimer, the term of this patent is extended or adjusted under 35 U.S.C. 154(b) by 25 days.

(21) Appl. No.: 10/380,181

(22) PCT Filed: Aug. 28, 2001

(86) PCT No.: PCT/SE01/01822

§ 371 (c)(1),
(2), (4) Date: Mar. 6, 2003

(87) PCT Pub. No.: WO02/19806

PCT Pub. Date: Mar. 14, 2002

(65) Prior Publication Data

US 2003/0150389 A1 Aug. 14, 2003

(30) Foreign Application Priority Data

Sep. 6, 2000 (SE) .............................................. 0003149

(51) Int. Cl.$^7$ ................................................. A01K 5/00
(52) U.S. Cl. ................................ 119/14.02; 119/14.04; 119/14.08
(58) Field of Search .......................... 119/14.02, 14.03, 119/14.04, 14.06, 14.07, 14.08, 14.14

(56) References Cited

U.S. PATENT DOCUMENTS

| | | | | |
|---|---|---|---|---|
| 1,787,152 A | * | 12/1930 | Hapgood | 119/14.04 |
| 3,095,854 A | * | 7/1963 | Bott et al. | 119/14.04 |
| 3,709,196 A | | 1/1973 | Hicks | |
| 3,835,814 A | * | 9/1974 | Jacobs et al. | 119/14.04 |
| 3,934,551 A | * | 1/1976 | Sulzberger | 119/14.04 |
| 4,261,292 A | | 4/1981 | Le Du | |
| 4,508,058 A | * | 4/1985 | Jakobson et al. | 119/14.02 |
| 5,784,993 A | * | 7/1998 | Osthues et al. | 119/14.04 |
| 6,050,219 A | * | 4/2000 | van der Lely | 119/14.08 |

FOREIGN PATENT DOCUMENTS

| | | |
|---|---|---|
| EP | 689761 | 1/1996 |
| EP | 689762 | 1/1996 |
| WO | WO 97/37530 | 10/1997 |

* cited by examiner

Primary Examiner—Teri P. Luu
Assistant Examiner—Bret Hayes
(74) Attorney, Agent, or Firm—Hovey Williams LLP

(57) ABSTRACT

The invention relates to a method of milking animals which uses an implement having a moveable floor on which the animals are milked in milking spaces. The animals enter and exit the floor via automatic gates. The invention involves automatic adjustment of the speed to the moveable floor first, on an estimated milking time of the animals presently in a milk flow mode, i.e. attached to a milking unit and second whether milking units have been attached to the animals before leaving an attachment zone, where the milking units are attached to the animals, either manually or automatically by a robot. The speed of the movable floor is primarily adjusted with the aim at optimizing the occupancy rate of the implement for milking animals with respect to the first condition. The second condition places constraint on when a speed increase is permitted.

19 Claims, 3 Drawing Sheets

CONSTRUCTION FOR MILKING OF ANIMALS

THE BACKGROUND OF THE INVENTION AND PRIOR ART

The present invention relates generally to milking of animals in milking spaces on a movable floor. More particularly, the invention relates to a method and apparatus for the milking of animals on the moving floor involving automatic adjustment of the speed of the moveable floor on the basis of an estimated milking time of the animals on the moving floor and attached to milking units.

Movable parlours are used for milking animals, such as cows, in order to reduce the milking time in comparison to static parlours. The movable parlours are generally equipped with an automatic animal entrance and exit, which provide for an efficient movement of the animals to and from the stalls. Sensors at the entrance and the exit register, for instance by means of transponders on the animals, which animals that enter respective leave the platform. This registration enables automatic determination of the individual animals that are present on the platform at any time.

There are different types of movable parlours. The most common type has a platform, which revolves around its own axis so as to perform a rotary motion. The platform thus has an over all circular form However, other types of movable parlours may have a linear, or partly linear, mode of operation and consequently have a non-circular form, e.g. a conveyor belt. Both of these main types of movable parlours can be subdivided into classes on basis of how milking spaces are arranged on the parlour. In the case of rotary parlours, the animals may face either outwards or inwards on the platform. The present invention is applicable to all of the movable parlours mentioned above.

The international patent application WO97/37530 describes a construction having an implement with a movable floor on which cows are milked in milk boxes by one or more milking robots. The speed of the movable floor is adjusted on basis of either the estimated milking time of the cows on the movable floor or the estimated residence time on the movable floor. The estimated milking time is in turn determined from an historical average milking time of the animals in question or from an estimated longest milking time of an animal presently on the movable floor. Correspondingly, the estimated residence time is in turn determined from either an historical average residence time of the particular animals or from an estimated longest residence time of those particular animals. Alternatively, these values can be derived from real time measurements of the cows during actual extraction of milk.

This known automatic adjustment of the speed of the movable floor is intended to increase the occupancy rate of the implement in comparison to manually operated floors and as a result thereof also improve the throughput, i.e. the retrieved amount of milk per time unit.

However, due to the varying speed of the movable floor it is difficult to bring animals through the entrance gate, onto the movable floor and attach them to milking units at a rate, which matches the speed variations. This is particularly the case when an operator manually attaches milking units to the animals.

SUMMARY OF THE INVENTION

The object of the present invention is to achieve milking by means of a movable floor having automatic speed adjustment which alleviates the problem above without reducing any accurateness in the estimated milking time and thereby maintain a high throughput.

According to one aspect of the invention the object is achieved by a method involving an automatic speed adjustment of the movable floor as initially described, which is characterised by attaching a milking unit to each animal when the respective animal is located in an attachment zone. The attachment zone is an area, which is stationary relative to the movable floor. The boundaries of the attachment zone are, however, flexible and may thus vary to define an area being anything between a single milking space wide to an area being wide enough to include the vast majority of milking units on the movable floor. The method further involves adjusting the speed of the movable floor on basis of an attachment parameter representing a positional status of animals being attached to milking units in the attachment zone.

According to another aspect of the invention the object is achieved by a method of automatically adjusting the speed of a movable floor on which animals to be milked are located in milking spaces. Each animal becomes attached to a milking unit when the respective animal is located in an attachment zone, which is stationary relative to the movable floor. The method according to this aspect of the invention involves (i) automatic speed adjustment of the movable floor on basis of an estimated milking time of the animals which are on the movable floor and are attached to a milking unit (and possibly already are in milk flow mode), and (ii) automatic speed adjustment of the movable floor on basis of an attachment parameter representing a positional status of animals being attached to milking units in the attachment zone.

According to a further aspect of the invention the object is achieved by a computer program directly loadable into the internal memory of a digital computer, comprising software for performing the method described in the above paragraph when said program is run on a computer.

According to yet another aspect of the invention the object is achieved by a computer readable medium, having a program recorded thereon, where the program is to make a computer perform the method described in the penultimate paragraph above.

According to still another aspect of the invention the object is achieved by a construction initially defined, which is characterised in that the implement for milking animals includes an attachment zone being defined between a point of entry onto the movable floor and a second point, and at least one attachment sensor indicating whether an animal has been attached to a milking unit. The speed adjusting mechanism for the movable floor further adjusts the speed of the movable floor on basis of an attachment parameter. A control unit derives the attachment parameter from signals received from the at least one attachment sensor. The attachment parameter represents a positional status of animals being attached to milking units in the attachment zone.

The proposed attachment zone introduces elasticity in the operation of the movable floor. This in turn results in a smooth action and thus low mechanical stress of the drive mechanism connected to the movable floor. Obviously, this is an especially desired effect, since both the maintenance costs for the construction can thereby be reduced and the construction's total lifetime is expected to be prolonged in comparison to the known solutions.

Furthermore, the smoother action accomplished by the invention reduces the mental stress both on the animals and any human operator involved the attachment process. This is, of course, desirable both from a biological and a working environmental point of view.

BRIEF DESCRIPTION OF THE DRAWINGS

The present invention is now to be explained more closely by means of preferred embodiments, which are disclosed as examples, and with reference to the attached drawings.

DESCRIPTION OF PREFERRED EMBODIMENTS OF THE INVENTION

Figure 1A:
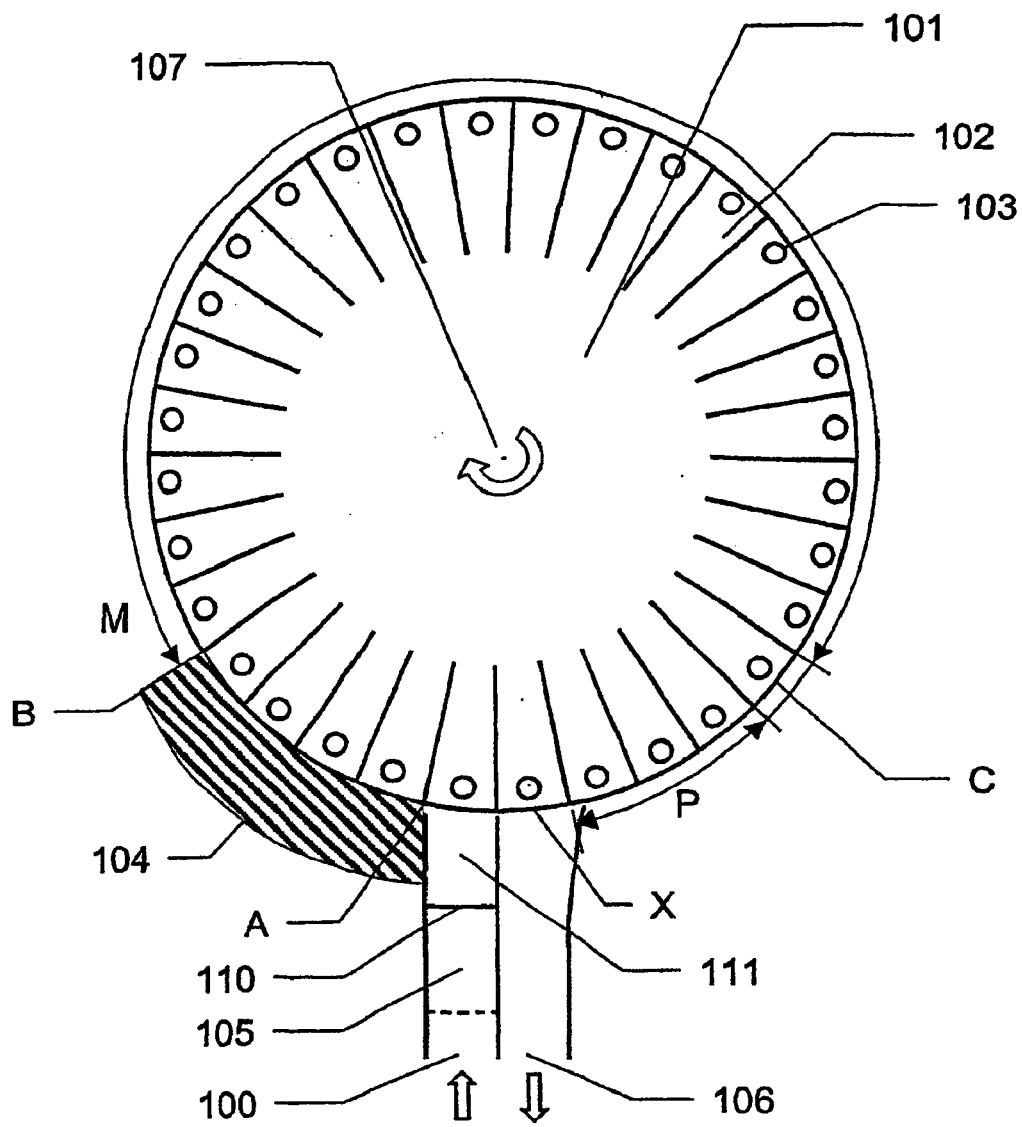
FIG. 1A shows a top view of a construction according to a first embodiment of the invention including a movable floor having a rotary motion around its central axis.

FIG. 1 shows a top view of a construction according to a first embodiment of the invention. Here, the animals are placed on a movable floor 101, which revolves around its central axis 107. Animals to be milked enter the construction through an entrance 100. Following the entrance 100 the animals come into an identification zone 105 where an ID-sensor (not shown) registers the identity of the animals, e.g. by means of a transponder technique. After having passed the identification zone 105, the animals progress through an automatic gate 110 and a passage 111. Then they embark the movable floor 101, which moves them in front of an attachment zone 104. The automatic gate 110, which opens and closes based on sensor signals indicating animals' presence in the identification zone 105 respective the attachment zone 104 such that an even flow of animals into the construction is obtained. The attachment zone 104 is an area in which one or more operators (not shown) move when attaching milking units to animals on the movable floor 101. Alternatively, at least one robot is positioned in the attachment zone 104 and attaches milking units 103 to animals automatically when they pass through the zone 104.

The earliest possible attachment of animals to milking units 103 is desirable, since this optimises the utilisation of the milking units 103 and thus the throughput. Ideally, an animal becomes attached to a milking unit 103 already at a first point A closest to the identification zone 105. Such early attachment maximises the number of animals in the parlour from which milk is extracted, because it makes a highest rotation speed possible. This in turn results in a maximized throughput (i.e. extracted amount of milk per time unit).

However, in order to enhance the flexibility of the operation of the construction and in order to make possible a smooth compensation for variations in the rotation speed of the movable floor, the point at which animals can be attached to a milking unit 103 is allowed to shift along the attachment zone 104. The outer boundary at which an attachment to a milking unit can be allowed is at a second point B also located in the attachment zone 104, however, most distant from the identification zone 105. It is important to note that the boundaries of the attachment zone are flexible and may vary to define an area 104 being anything between a single milking space 102 wide to an area 104 being wide enough to include the vast majority of milking units on the movable floor 101. Hence, the attachment zone 104 being illustrated as four milking spaces 102 wide in the FIG. 1A should only be regarded as an example. Any other width, corresponding to an integer or a fractional number of milking spaces larger than or equal to one, is conceivable. Typically, the attachment zone 104 is very large in an initial stage of the milking procedure (i.e. when movable floor 101 is first empty and then successively filled with animals). In later stages of the procedure the attachment zone 104 should decrease and ideally level out on a small width. Finally, the attachment zone 104 is not confined by any physical means (such as fences or walls) but is purely an imaginary area defining in which milking spaces on the movable floor 104 that animals may be located without being attached to a milking unit 103.

A third point C denotes a position, at which the animals must have completed their milking in order to have enough time for post treatment, which takes place in a following post treatment zone P. According to the invention the speed of the movable floor is adjusted such that an animal having the longest expected milking time has completed its milking at the point C. If there nevertheless still is milk to be extracted in an animal when it reaches the point C, the movable floor 101 stops completely until the milking of that animal is finished. A point X at which the animals must leave the movable floor 101 via an exit 106 follows the post treatment zone P. At this point X the floor 101 has namely completed a full revolution around its central axis 107 and the milking space 102 must be freed to make room for another animal. An ID-sensor (not shown) at the exit 106, corresponding to the ID-sensor in the identification zone 105, registers the identities of animals leaving the parlour. This makes it possible to automatically maintain an accurate record of animals located on the movable floor at any time. The variation of the point at which an animal becomes attached to a milking unit 103 results in a maximal variation of a milking zone M (i.e. the area where the animals are in so-called milk flow mode) between the first point A to third point C and the second point B to the third point C. Furthermore, the point B may be shifted to define a larger or a smaller attachment zone 104 depending on the expected milking time of the animals currently in milk flow mode.

An attachment sensor is positioned to detect whether an animal has been attached to a milking unit 103. Thus, it is preferable to co-locate the attachment sensor with the respective milking units 103. The attachment sensor need not be a unique unit or a unit physically separated from other units. On the contrary, it is preferable to regard it as a part of another sensor or function in the construction, such as the point in time when the operator switches on a vacuum pump in a particular milking unit 103 (and thus starts the milk extraction process), a sensor measuring the pressure in such a vacuum pump, or a milk flow sensor measuring milk retrieved via a particular milking unit 103. Alternatively, the attachment sensor can be a switch, which is activated when a cluster in a milking unit 103 is lifted into milking position towards the teats of an animal.

The post treatment zone P here illustrated as being three milking spaces 102 wide should only be considered as an example put forward in this embodiment of the invention. Any other width is, of course, equally possible.

In order to determine whether an unattached animal (i.e. not connected to a milking unit 103) has reached the second point B a control unit (not specifically shown) calculates a number of unattached animals by subtracting the number of attached animals (derived from signals from attachment sensors) and a constant from the total number of milking spaces 102 on the movable floor 101. If this number is equal to the current width of the attachment zone 104 it means that an unattached animal is positioned at the second point B. A lower number, of course, means that this is not the case. In the example shown in FIG. 1A, where the attachment zone 104 is four milking spaces wide and the total number of milking spaces is thirty-two, at least twenty-six animals shall always be attached to a milking unit 103 when the construction is in full operation. (The constant is here equal to the two milking spaces, which must be reserved for entrance respective exit.)

On basis of data from the ID-sensor in the identification zone 105 respective the ID-sensor at the exit 106 relevant information regarding the milking capabilities of the animals currently on the movable floor 101 can be acquired, either through real time measurements or from a database containing historical data. Signals from the attachment sensors indicate which specific animals that are attached to milking units 103 and based on this combined information an accurate estimated milking time is calculated. This figure in turn provides a parameter to the adjusting mechanism for adjusting the speed of the movable floor, i.e. whether it is desirable to increase the speed, decrease the speed or maintain the speed unchanged. Nevertheless, the control unit decides, on basis of signals from the attachment sensors and from the calculations above, whether it is actually permissible to increase the speed. This decision by the control unit can be regarded as an attachment parameter, which represents a positional status of animals being attached to milking units 103 in the attachment zone 104. If the attachment parameter indicates that the animal which was latest attached to a milking unit 103 is positioned within the boundaries of the attachment zone, i.e. between the first point A and the second point B, a speed increase is permitted. Otherwise, a speed increase is prevented, even if it would have been desirable from a milking time point of view. The speed cannot be further increased if such increase of the speed would result in animals leaving the attachment zone 104 without having been attached to a milking unit 103.

Figure 1B:
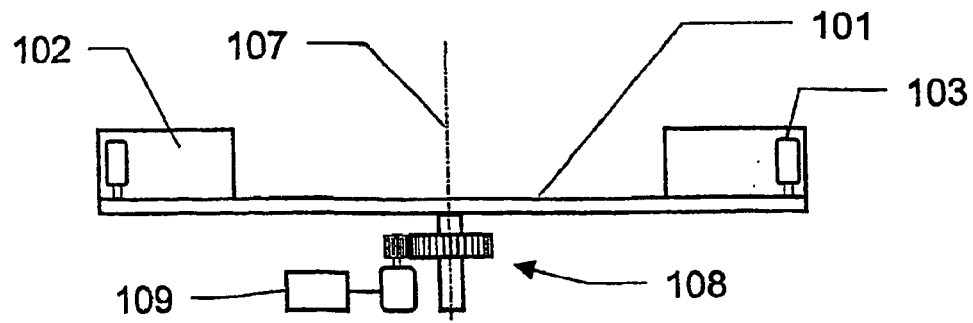
FIG. 1B shows a side view of the construction in FIG. 1A.

FIG. 1B shows a side view of the embodiment of the invention shown in FIG. 1A. Vertical walls separate the milking spaces 102 and a milking unit 103 is associated to each milking space 102. A drive mechanism 108 including e.g. an engine and a gearbox propels the movable floor 101 around its central axis 107. An automatically operative adjusting mechanism 109 adjusts the speed of the movable floor 101 based on certain input parameters according to the proposed method. The estimated milking time of the animals, which are on the movable floor and are attached to milking units, plus the attachment parameter constitute such input parameters.

Figure 2:
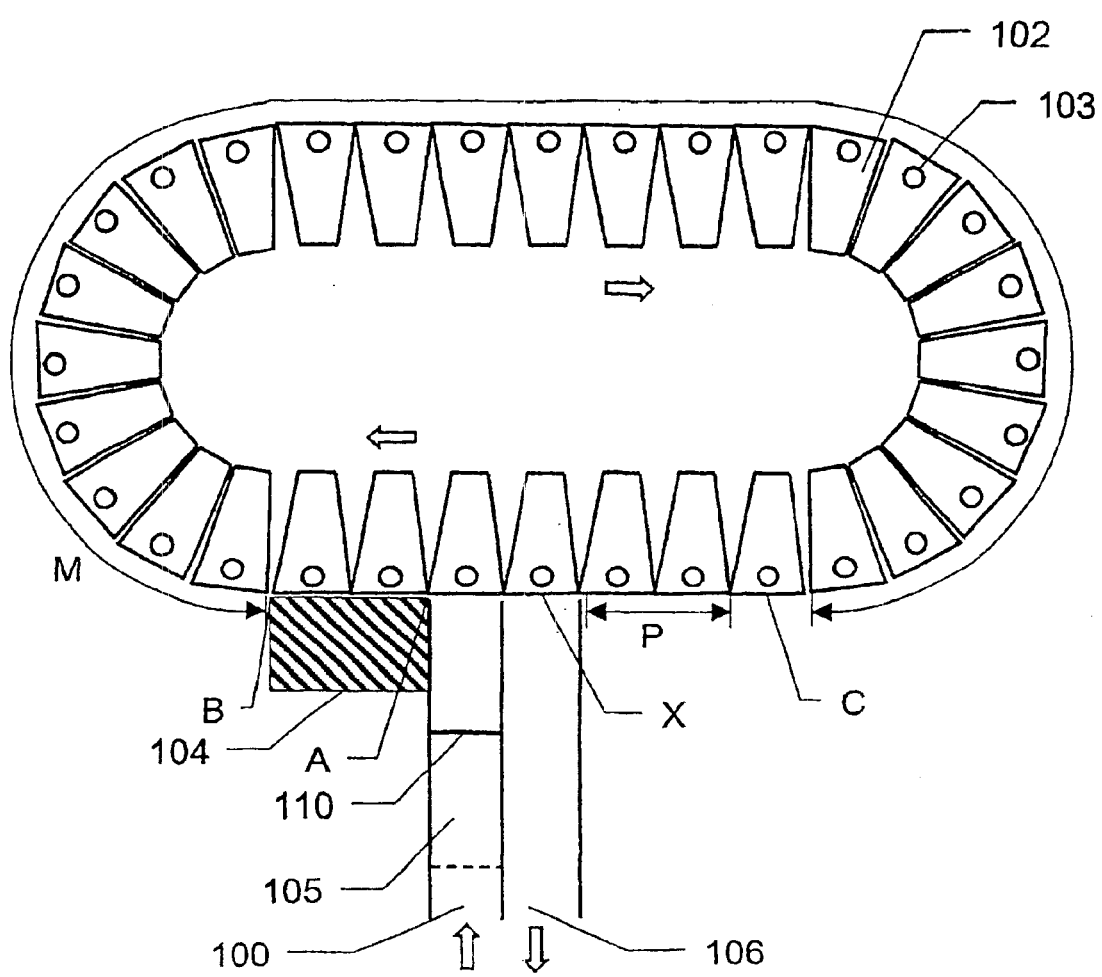
FIG. 2 shows a top view of a construction according to a second embodiment of the invention including a segmented movable floor having a non-circular mode of operation.

As mentioned earlier the movable floor, constituting the parlour, can either revolve around its own axis or move according to a non-circular principle. A conveyor belt, for instance constitutes an example of a linear movement of the floor. Yet a different type of movable floor is illustrated in FIG. 2. Features corresponding to those discussed with reference to FIGS. 1A and 1B are allocated the same reference numbers as in these figures. Segments 102 in the form of milking spaces, which are hooked onto each other like wagons of a train and move along a rail (not shown), here make up the movable floor. A milking unit 103 is also associated with each milking space 102. Like in the first described embodiment of the invention animals to be milked enter the construction through an entrance 100. Following the entrance 100 the animals come into an identification zone 105 where an ID-sensor (not shown) registers the identity of the animals. After having passed the identification zone 105 the animals reach an attachment zone 104, that preferably is separated from the identification zone 105 by means of an automatic gate 110, which opens and closes based on sensor signals indicating animals' presence in the identification zone 105 respective the attachment zone 104. In this embodiment of the invention both the attachment zone 104 and the post treatment zone P are two milking spaces wide. Any other widths of these zones are, of course, equally possible.

Figure 3:
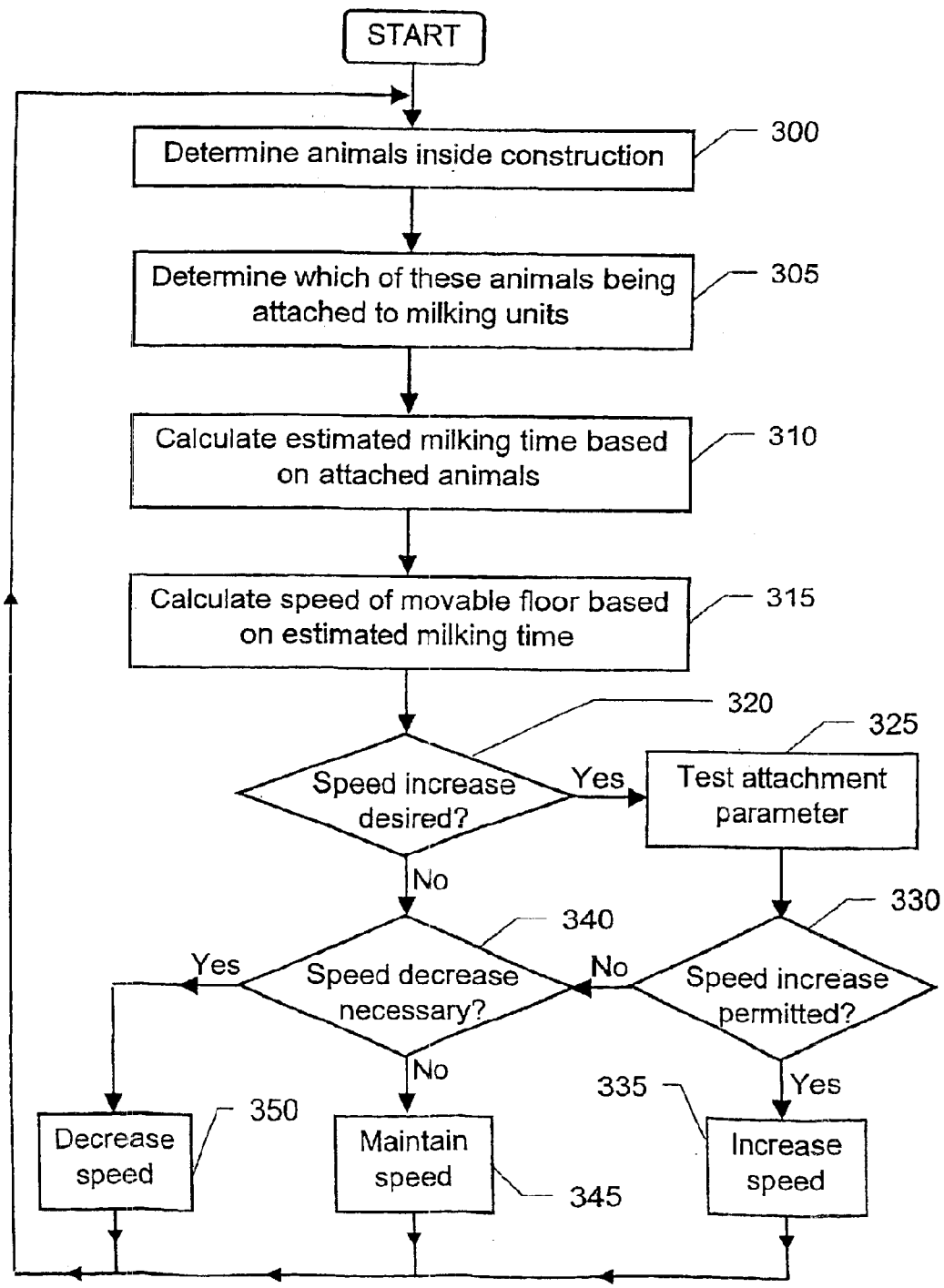
FIG. 3 illustrates an embodiment of the method according to the invention in a flow diagram.

FIG. 3 illustrates an embodiment of the method according to the invention in a flow diagram. A first step 300 determines which animals that are presently inside the construction, i.e. within the entrance and the exit. An accurate record of such animals are accomplished by identifying all animals entering the construction, storing a listing of those animals, identifying all animals exiting the construction and updating the listing accordingly. A following step 305 determines which of the animals determined in step 300 that are located on the movable floor and are attached to a milking unit. A subsequent step 310 calculates an estimated milking time for the animals identified in step 305. Once the estimated milking time has been computed, according to any of the methods known from the prior art, a speed of the movable floor is calculated in a succeeding step 315, which optimises the utilisation of the milking equipment included in the construction based on the estimated milking time.

One outcome of the calculation in step 315 is that it would be desirable to increase the present speed. A following step 320 inquires whether this is the case. An affirmative answer to the inquiry in step 320 leads the procedure to a step 325, which tests the attachment parameter (which, as described earlier, indicates the positional status of animals being attached to milking units in the attachment zone). A step 330 following step 325 checks if it is permissible to increase the speed with respect to the attachment parameter, and if so a speed increase is ordered in a subsequent step 335 such that the speed calculated in step 315 gradually is attained. The procedure is then looped back to the step 300.

However, if the attachment parameter prevents any further speed increase the procedure continues from step 330 to a step 340, which inquires whether a speed decrease is necessary. Coming from step 330 this is rarely the case, but if the answer to the question posed in step 320 is negative the situation is different. A negative response to the inquiry in step 340 forwards the procedure to a step 345, which orders that the present speed of the movable floor be maintained. The procedure is then looped back to the step 300.

A positive response to the inquiry in step 340 instead forwards the procedure to a step 350, which orders a speed decrease such that the speed calculated in step 315 gradually is attained, e.g. by using the engine as a braking system. The procedure is then looped back to the step 300.

The method steps described with reference to FIG. 3 above are preferably executed by means of a digital computer and thus realised in software code. Naturally, this code can be recorded on arbitrary kind of computer readable medium, be transferred over any type data transmission line (operated under any known transmission format), and be loaded into a general-purpose computer.

Although the invention primarily is intended to be utilised in connection with cow milking the invention is equally well adapted for milking any other kind of mammals, such as goats or sheep.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

What is claimed is:

1. A method of milking animals in which animals to be milked are located in milking spaces on a movable floor, said method comprising of the steps of:
   attaching a milking unit to each animal when the respective animal is located in an attachment zone having boundaries, said attachment zone being stationary relative to the moveable floor;
   adjusting automatically the speed of the moveable floor based on an estimated milking time of the animals located on said movable floor and attached to the milking units; and
   further adjusting the speed of the movable floor based on an attachment parameter representing a positional status of animals being attached to milking units in the attachment zone, wherein
      the attachment parameter is determined by the position of the animal which was latest attached to a milking unit relative to the boundaries of the attachment zone.

2. A method according to claim 1, wherein the boundaries of the attachment zone include a first limit at a point of entry onto the movable floor and a second limit located a distance corresponding to at least one milking space away from the point of entry along the direction of advancement of the movable floor.

3. A method according to claim 2, said method further comprising of the step of: adjusting the speed of the moveable floor, whereby a speed increase is permitted whenever the animal which was latest attached to a milking unit is positioned within the boundaries of the attachment zone, and a speed increase is prevented otherwise.

4. A method of automatically adjusting the speed of a movable floor on which animals to milked are located in milking spaces, said method comprising of the steps of:
   attaching each animal to a milking unit when the respective animal is located in an attachment zone having boundaries, said attachment zone being stationary relative to the movable floor; and
   adjusting automatically the speed of the movable floor based on an attachment parameter representing a positional status of animals being attached to milking units in the attachment zone, wherein
      the attachment parameter is determined by the position of the animal which was latest attached to a milking unit relative to the boundaries of the attachment zone.

5. A method according to claim 4, wherein the boundaries of the attachment zone include a first limit at a point of entry onto the movable floor, and a second limit located a distance corresponding to at least one milking space away from the point of entry along the direction of advancement of the movable floor.

6. A method according to claim 5, said method further comprising of the step of adjusting the speed of the moveable floor whereby a speed increase is permitted whenever the animal which was latest attached to a milking unit is positioned within the boundaries of the attachment zone, and a speed increase is prevented otherwise.

7. A computer program directly loadable into the internal memory of a digital computer, said computer program comprising software for performing the steps of claim 4 when said program is run on a computer.

8. A computer readable medium, having a program recorded thereon whereby the program instructs the computer to perform the steps of claim 4.

9. A construction including an implement for milking animals, the implement comprising:
   a movable floor including multiple milking spaces, each said milking space including a milking unit; and
   an automatically operative adjusting mechanism for adjusting the speed of the movable floor based on an estimated milking time of the animals which are on the movable floor and are attached to the milking units, said implement further comprising:
      at least one attachment sensor for indicating whether an animal has been attached to a milking unit;
      a control unit receiving signals from the at least one attachment sensor, and
      an attachment zone being defined between
         a point of entry onto the movable floor and a second point,
      said adjusting mechanism for adjusting the speed of the movable floor being further operable for adjusting the speed of the movable floor based on an attachment parameter derived by the control unit from signals received from the at least one an attachment sensor,
         said attachment parameter representing a positional status of the animal which was latest attached to a milking unit in the attachment zone.

10. A construction according to claim 9, wherein the second point is located at a distance corresponding to at least one milking space away from the point of entry onto the movable floor along the direction of advancement of the movable floor.

11. A construction according to claim 9, wherein the at least one attachment sensor is collocated with a respective milking unit.

12. A construction according to claim 9, wherein the adjusting mechanism for adjusting the speed of the movable floor regulates the speed in response to the signals from the first respective attachment sensor, whereby a speed increase is permitted whenever the animal which was latest attached to a milking unit has not yet reached the first point, and a speed increase is prevented otherwise.

13. A computer program directly loadable into the internal memory of a digital computer, said computer program comprising software for performing the steps of claim 5 when said program is run on a computer.

14. A computer program directly loadable into the internal memory of a digital computer, said computer program comprising software for performing the steps of claim 6 when said program is run on a computer.

15. A computer readable medium, having a program recorded thereon whereby the program instructs the computer to perform the steps of claim 5.

16. A computer readable medium, having a program recorded thereon whereby the program instructs the computer to perform the steps of claim 6.

17. A construction according to claim 10, wherein the at least one attachment sensor is collocated with a respective milking unit.

18. A construction according to claim 10, wherein the adjusting mechanism for adjusting the speed of the movable floor regulates the speed in response to the signals from the first respective attachment sensor, whereby a speed increase is permitted whenever the animal which was latest attached to a milking unit has not yet reached the first point, and a speed increase is prevented otherwise.

19. A construction according to claim 11, wherein the adjusting mechanism for adjusting the speed of the movable floor regulates the speed in response to the signals from the first respective attachment sensor, wherein a speed increase is permitted whenever the animal which was latest attached to a milking unit has not yet reached the first point, and a speed increase is prevented otherwise.

* * * * *